L. O. EKREM.
HARROW.
APPLICATION FILED JAN. 5, 1911.
998,480.
Patented July 18, 1911.
2 SHEETS—SHEET 1.
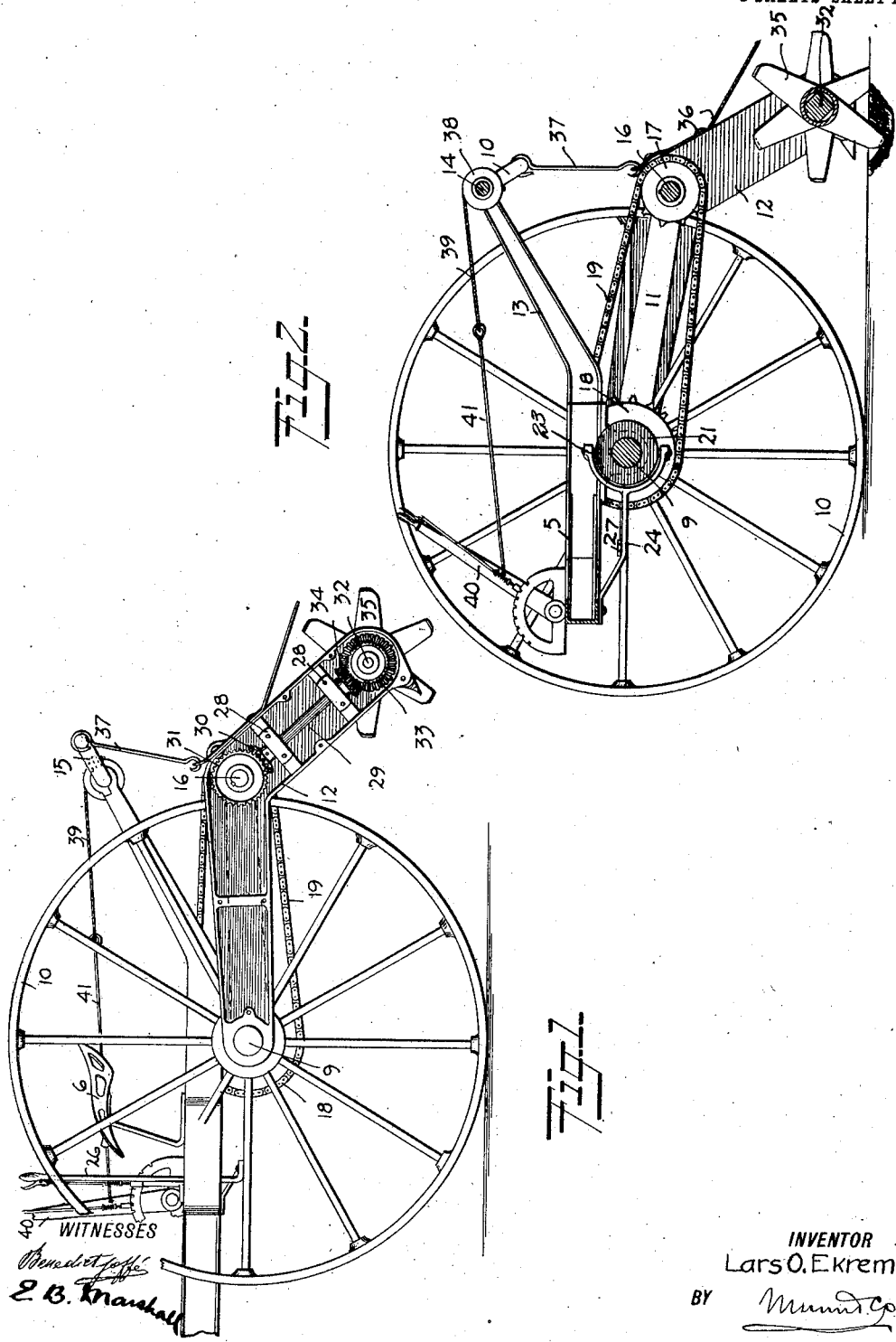

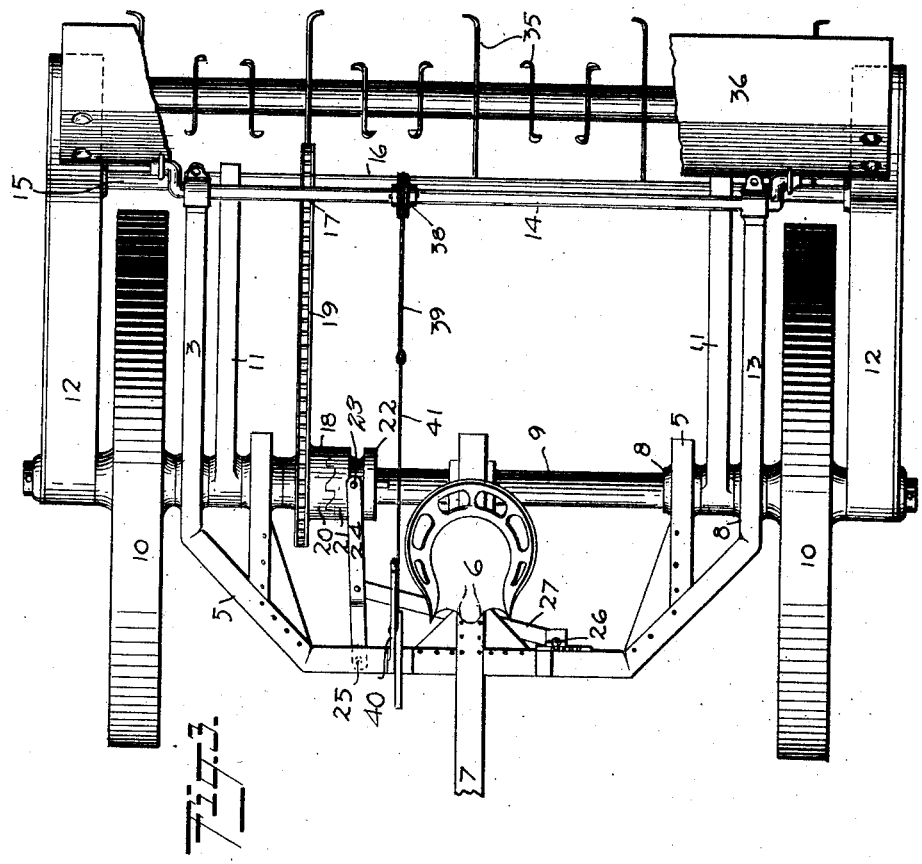
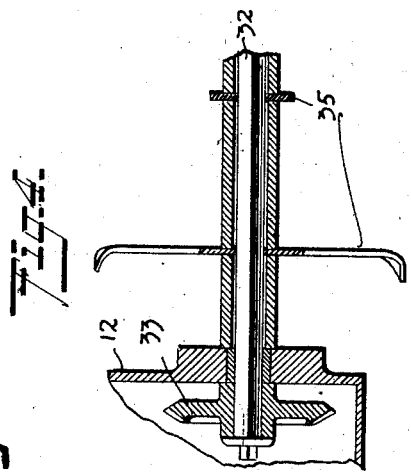

UNITED STATES PATENT OFFICE.

LARS OLSEN EKREM, OF CALUMET, MICHIGAN.

HARROW.

998,480. Specification of Letters Patent. Patented July 18, 1911.

Application filed January 5, 1911. Serial No. 600,916.

*To all whom it may concern:*

Be it known that I, LARS O. EKREM, a subject of the King of Norway, and a resident of Calumet, in the county of Houghton and State of Michigan, have invented a new and Improved Harrow, of which the following is a full, clear, and exact description.

My invention relates to harrows, and it has for its object to provide means for rotating the shaft to which knives are secured from the axle on which the wheels are mounted, and also means for raising arms to which the shaft is journaled, the arms being pivoted to the said axle.

Additional objects of the invention will appear in the following complete specification, in which the preferred form of my invention is disclosed.

In the drawings similar characters of reference indicate corresponding parts in all the views, in which—

Figure 1 is a side elevation of the harrow, partially in section; Fig. 2 is a longitudinal sectional view of the harrow; Fig. 3 is a plan view of the harrow; and Fig. 4 is an enlarged fragmentary view showing the means of mounting the shaft carrying the knives.

By referring to the drawings it will be seen that a frame 5 is provided, on which a seat 6 is mounted, and to which a tongue 7 is secured. The frame 5 is provided with bearings 8, to which the axle 9 is journaled, the wheels 10 being secured to the said axle. To the axle 9 are pivoted arms 11 and also hollow arms 12, the said hollow arms 12 being preferably disposed at the outer sides of the wheels 10, as best shown in Fig. 3 of the drawings. The frame 5 is continued rearwardly forming upwardly-extending arms 13, in which a shaft 14 is journaled, this shaft 14 having cranks 15. Journaled in bearings in the arms 11, and also in the arms 12, there is a shaft 16, this shaft 16 being provided with a sprocket wheel 17, which is connected to a sprocket wheel 18 mounted freely on the axle 9, by means of a sprocket chain 19. A clutch member 20 is secured to one side of the sprocket wheel 18, this clutch member being adapted to be engaged by a clutch member 21, which is keyed to the shaft 9. As shown in Fig. 3 of the drawings, the clutch member 21 has an annular groove 22, in which are disposed fingers 23, which are secured to the lever 24, this lever 24 being pivoted to the frame 5 at 25. The lever 24 is connected with the operating lever 26 by means of a link 27. In the hollow arms 12 are mounted bearing members 28, in which are journaled shafts 29, these shafts 29 having beveled gears 30, which mesh with gears 31, secured to the shafts 16. A shaft 32 is journaled in the hollow arms 12, near their lower terminals, beveled gears 33 being mounted on the said shaft 32 within the hollow arms 12 respectively, these beveled gears 33 being engaged by beveled gears 34 which are secured to the shafts 29. Knife members 35 are secured to the shaft 32. A guard 36 is secured to the hollow arms 12, and extends from one side to the other of the machine at its rear. Links 37 are provided for connecting the cranks 15 previously referred to the guard 36. A pulley 38 is secured to the shaft 14, a rope 39 being wound around and secured to the said pulley 38, this rope 39 being connected with the operating lever 40 by means of a rod 41. It will be seen that as the shaft 29 and the gear wheels 30, 31, 33 and 34 are inclosed in the hollow arms 12, they will be protected from rain and dust.

In using the invention the farmer may by means of the operating lever 40, lower the arms 11 and 12, carrying the shaft 32, the shaft 16, and the guard 36, so that the teeth 35 will be in position to engage the soil. This having been done, the clutch member 21 is drawn into engagement with the clutch member 20, by means of the operating lever 26, and the harrow is drawn over the ground; the wheels 10 will then cause the axle 9 to rotate, carrying with it the sprocket wheel 18. As the sprocket chain 19 is drawn over the said sprocket wheel 18 in the well-known manner, it will, by the means which have been described, cause the shaft 32 to rotate, as well as the shaft 16. As the shaft 32 rotates it will carry with it the teeth 35 which will work the soil to accomplish the desired result.

Having thus described my invention, I claim as new and desire to secure by Letters Patent:

In a harrow a frame, an axle journaled in bearings in the frame, wheels secured to the axle, a sprocket wheel having a clutch member mounted freely on the axle, a clutch member mounted to rotate with the axle and adapted to engage the first-mentioned clutch member, means for moving the second-mentioned clutch member into engagement with the first-mentioned clutch member, arms pivoted to the axle one of which has a hollow portion, two shafts journaled in bearings in the arms, a sprocket wheel secured to one of the shafts, knives secured to the other shaft, a sprocket chain connecting the two sprocket wheels, gearing in the hollow arm by which the shaft carrying the sprocket wheel is adapted to drive the shaft carrying the knives, a guard mounted on the arms, additional arms secured to the frame, and means mounted on the last-mentioned arms, connected with the guard, for raising the first-mentioned arms, the shafts, and the guard, relatively to the frame.

In testimony whereof I have signed my name to this specification in the presence of two subscribing witnesses.

LARS OLSEN EKREM.

Witnesses:
ANTON ANDERSON,
GEORGE NORDSTROM.

Copies of this patent may be obtained for five cents each, by addressing the "Commissioner of Patents, Washington, D. C."